United States Patent [19]
Werner et al.

[11] 3,765,946
[45] Oct. 16, 1973

[54] FUEL CELL SYSTEM

[75] Inventors: Lawrence H. Werner, Vernon; John C. Trocciola, Glastonbury, both of Conn.

[73] Assignee: United Aircraft Corporation, East Hartford, Conn.

[22] Filed: Aug. 18, 1971

[21] Appl. No.: 172,656

[52] U.S. Cl. .............................................. 136/86 C
[51] Int. Cl. .............................................. H01m 27/00
[58] Field of Search .................. 136/86 C, 86 R; 55/16, 158, 159; 73/23

[56] References Cited
UNITED STATES PATENTS

| | | | |
|---|---|---|---|
| 2,699,836 | 1/1955 | Barton | 55/158 |
| 3,241,293 | 3/1966 | Pfefferle | 55/158 |
| 3,192,070 | 6/1965 | Tragert et al. | 136/86 C |
| 3,369,343 | 2/1968 | Robb | 55/16 |
| 3,523,408 | 8/1970 | Rosenberg | 55/159 |

*Primary Examiner*—A. B. Curtis
*Assistant Examiner*—H. A. Feeley
*Attorney*—Alfred W. Breiner

[57] ABSTRACT

A fuel cell system comprising an anode, a cathode and an electrolyte in combination with a reformer system comprising a reformer and reformer gas separator is described. The reformer gas separator comprises a first membrane selectively permeable to a consumable reactant gas (hydrogen) and a second membrane spaced from said first membrane selectively permeable to impurities or detrimental gases ($CO_2$). A sweep gas is maintained at the downstream side of the second membrane reducing the partial pressure of the detrimental gas and effectively increasing the partial pressure of the reactant gas providing a more efficient system.

8 Claims, 2 Drawing Figures

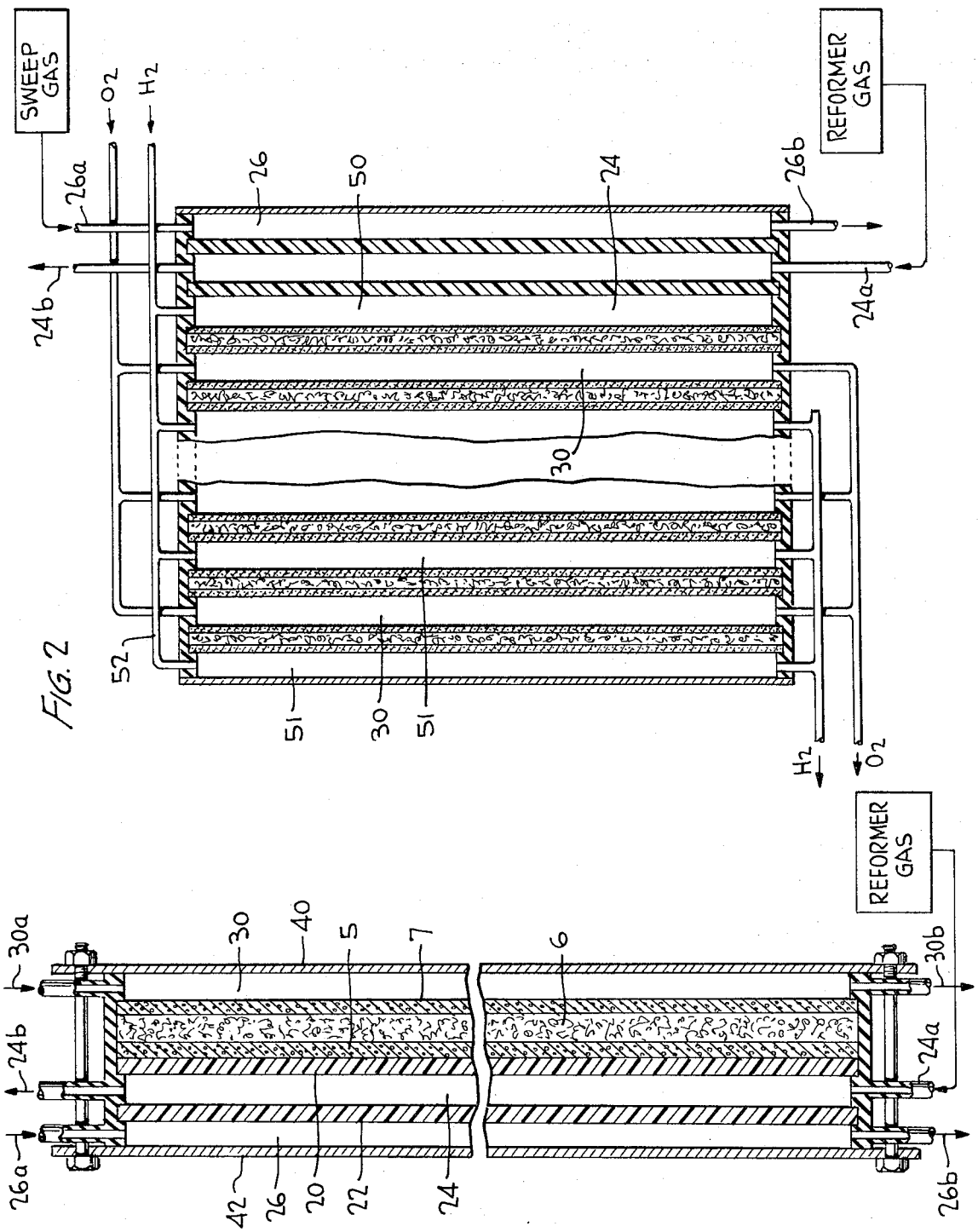

FUEL CELL SYSTEM

FIELD OF INVENTION AND BACKGROUND

This invention is directed to an improved fuel cell system capable of operation on impure fuel reactants of the type originating in a hydrocarbon reform unit. More particularly the invention is directed to a fuel cell unit comprising a plurality of membranes, a first membrane being selectively permeable to a reactant and a second membrane being selectively permeable to impurities or detrimental gases. For convenience the invention will be described in reference to a fuel cell using hydrogen gas as the reactant and where the impurities are primarily carbon dioxide, carbon monoxide, methane, etc. However, as will be apparent, similar consideration governing the use of the invention in fuel cells operated on hydrogen will apply to other electrochemical devices enabling the use of the invention in such devices.

A fuel cell as the term is employed herein designates an electrochemical cell for the direct generation of electrical energy from a fuel and oxidant. With such cells it is not necessary to go through the usual conversion of chemical energy to heat energy to mechanical energy to electrical energy as is common with heat engines. Such cells in their most simplified design comprise a housing, an oxidant electrode, a fuel electrode, and an electrolyte. In operation it is necessary that the fuel and oxidant contact a surface of their respective electrodes where a process of adsorption and desorption occurs leaving the electrodes electrically charged with the second surface of the electrodes being in contact with the electrolyte. Depending upon the nature of the electrolyte, ions are transferred through the electrolyte from the anode to the cathode or from the cathode to the anode. Electrical current is withdrawn from the cell and passed through a suitable load where work is accomplished.

Although it is theoretically possible to operate a fuel cell or gaseous or liquid hydrocarbon fuels, with fuel cells having been constructed and designed for such operation, such cells have various disadvantages including poisoning of the catalytic electrode resulting in short cell life; low performance characteristics, etc. As a result of such shortcomings, fuel cell systems have been described which include a hydrocarbon reformer integral therewith, either external of the fuel cell stack or as an internal part of the fuel cell stack. with these systems it is necessary for efficient operation of the cell to separate impurities from the reform gas stream prior to contact with the cell electrode. This separation has been accomplished in the past by positioning hydrogen permeable membranes such as non-porous palladium-silver alloy membranes which selectively diffuse hydrogen through the membrane between the reformer and fuel electrode. Although these cells are generally acceptable from the performance standpoint, the membranes are costly and further are limited in performance due to the increased partial pressure of detrimental gases such as carbon dioxide due to build up of the detrimental gases in the environment of the separator with resultant decrease in the partial pressure of hydrogen.

OBJECTS AND GENERAL DESCRIPTION

Accordingly, a primary object of the present invention is the construction of an improved fuel cell system comprising a fuel cell in combination with a reformer system including a gas separator means which is efficient and economical.

It is another object of this invention to provide a gas separator system which is efficient and continuously maintains a high gas partial pressure of the gas being collected.

It is another object of this invention to provide an integral fuel cell and gas separtor system which is compact, efficient and relatively economical.

These and other objects of the present invention will be more readily apparent from the following detailed description with particular emphasis being placed on the embodiments illustrated in the drawing.

The objects of the present invention are accomplished by constructing a fuel cell unit for operation in combination with a reformer, or fed with an impure or reformer gas comprising two selectively gas permeable membranes in functional association with the fuel electrode of the cell. Both gas permeable membranes are in fluid contact with a gas stream containing hydrogen and impurities. One membrane is selectively permeable to hydrogen while preventing diffusion of gases which are detrimental to fuel cell performance. The second membrane is selectively permeable to the detrimental gases while hindering the passage of hydrogen. The detrimental gases are continuously swept away from the downstream side of the membrane reducing the partial pressure of the detrimental gas and effectively increasing the partial pressure of hydrogen.

In a preferred embodiment, the hydrogen permeable membrane is in intimate contact with the fuel electrode whereby hydrogen which is diffused through the membrane is consumed at the electrode as it diffuses through the membrane. Alternatively, one gas separator unit can service a stack of fuel cells. This gas separator unit can be an internal and integral part of the fuel cell unit or it can be separated from the fuel cell unit, e.g., it can be integral with the reformer unit or spaced between the fuel cell unit and a reformer unit. The overall system is highly efficient in comparison to the efficiency of a system utilizing a single membrane in that the partial pressure of the detrimental gases are reduced, effectively increasing the partial pressure of hydrogen. Moreover, the sweep gas which is used to remove the detrimental gases from the downstream side of the membrane, can be used to cool the fuel cell system.

Gas diffusion membranes which can be used herein as the membrane selectively permeable to hydrogen include polytetrafluoroethylene, polytrifluoroethylene, polyvinyl fluoride, polyvinylidene fluoride, polyacrylonitryl polytrifluorochloro ethylene, and co-polymers thereof. Other membranes which can be employed are polyacrylonitrile and co-polymers thereof. Membranes which are selectively permeable to detrimental gases while hindering or precluding the passage of hydrogen are silicone rubber, polybutadiene, neoprene, butyl rubber, chlorosulfonated polyethylene, polyesteramide-diisocyanate and the like.

THE DRAWING AND SPECIFIC EMBODIMENTS

In order to more specifically illustrate the invention reference is made to the drawing wherein FIG. 1 is a transverse sectional view of a single cell constructed in accordance with the present invention, and FIG. 2 is a transverse sectional view of an embodiment utilizing a single gas separator unit in combination with a fuel cell stack comprising a plurality of cells. In the drawing like parts are designated by like numerals.

Referring to FIG. 1, the fuel cell system comprises an anode 5, a cathode 7 and an electrolyte contained in electrolyte matrix 6. In the embodiment shown in FIG. 1, electrodes 5 and 7 are lightweight screen electrodes comprising a conductive nickel screen enbedded in a uniform admixture of catalytic metal, in this instance platinum, and polytetrafluoroethylene particles. The ratio of platinum to polytetrafluoroethylene on a volume basis is 3:5, with the platinum loading of the electrode being 15 $mg/cm^2$. The elctrodes are approximately 10 mils in thickness. The electrolyte matrix is pressed asbestos and is approximately 25 mils in thickness. One end wall 40 of the cell housing in combination with cathode 7 forms oxidant chamber 30. Membrane 20 which is selectively permeable to hydrogen is adjacent to and in contiguous contact with anode 5. Membrane 20 together with membrane 22, which is selectively permeable to detrimental gases, forms a chamber 24 for passage of a reformer or other impure gaseous streams fed for example from a reformer. Membrane 22 and end-wall 42 of the cell housing form chamber 26 for passage of a sweep gas which removes the detrimental gases from the environment of the membrane, reducing the partial pressure of the gas.

In operation a 30 percent aqueous potassium hydroxide electrolyte solution is retained in matrix 6. Air is fed into oxidant chamber 30 through oxidant inlet 30a with impurities being vented through exit 30b. A gaseous stream from a reformer is fed into gas chamber 24 through inlet 24a with any excess gas being vented through exit 24b and collected for recirculation if desired. As the gaseous stream passes through reactant chamber 24, hydrogen is removed through hydrogen permeable membrane 20 where it is consumed at anode 5. Detrimental gases such as carbon dioxide, carbon monoxide and methane are removed through membrane 22 and continuously swept away with a gas such as air which flows continuously through chamber 26 via inlet 26a and outlet 26b. If desired, this sweep gas, which will contain $CO_2$, can be circulated to the cathode and used as the cell oxidant. The cell when operated at a constant current drain will provide a substantially constant cell output. There is little fluctuation in current characteristics of the cell since the partial pressure of the hydrogen remains high as a result of the continuous removal of the detrimental gas from the vicinity of the anode.

At FIG. 2, an alternative embodiment is illustrated in which a single gas separator unit at the end of a stack of cells services all of the anodes of the stack. As seen from FIG. 2, a reformer gas is fed to gas passage 24 through inlet 24a with excess gas being vented through outlet 24b where it can be collected for reclaiming if desired. Hydrogen is diffused through hydrogen permeable membrane 20 into fuel chamber 50 and fed to fuel chamber 51, adjacent to the anodes of the stack through manifold means 52. A sweep gas is continuously fed to gas chamber 26 through inlet 26a and vented through outlet 26b. This unit provides an efficient and economical purification unit permitting the operation of the cell stack on impure gases received directly from a hydrocarbon reformer unit.

Although the present invention has been described with reference to lightweight electrodes comprising a metal support screen imbedded in a catalytic mixture of metal and hydrophobic plaster binder, other electrodes can be employed including bi-porous and homoporous metal sinters or the like. Moreover, although it is indicated that the electrolyte matrix is made of asbestos, other hydrophilic matrixes, including ceramic metals and polymeric materials, can be utilized. Additionally, the cell can be operated with a circulating freeflowing electrolyte. Further, the selectively permeable membranes 20 and 22 can be replaced by other selectively permeable membranes having the desired characteristics. Although the fuel cell system shown in FIG. 2 has the gas separator unit as an internal and integral part of the fuel cell stack, the separator unit can be external of the fuel cell stack as, for example, a separate unit or a part of the reformer unit. As will be apparent to one skilled in the art, various other modifications can be made in the overall cell design to meet operating conditions. These modifications being within the ability of one skilled in the art are to be covered herein with the invention only being limited in accordance with the appended claims.

It is claimed:

1. A fuel cell system comprising a fuel cell including an anode, a cathode, and an electrolyte, and a gas separator constructed and arranged in operative association with said fuel cell, said gas separator comprising a first membrane selectively permeable to a consumable fuel cell reactant gas and substantially non-permeable to gases non-consumable in said fuel cell, and a second membrane spaced from said first membrane which is substantially impermeable to a consumable fuel cell reactant gas and selectively permeable to gas impurities not consumable in a fuel cell, said first and second membranes forming a gas passage, means for feeding into said passage a fuel cell reactant gas mixture including consumable and non-consumable gases, said first membrane being in operative association at its downstream side with the anode of said fuel cell and the downstream of said second membrane being in operative association with means for sweeping said gas impurities from the downstream surface of said second membrane, thereby reducing the partial pressure of said gas impurities and effectively increasing the partial pressure of said reactant gas.

2. The fuel cell system of claim 1 wherein said anode and downstream side of said first membrane are contiguous.

3. The fuel cell system of claim 1 wherein the first membrane is a polymer selected from the group consisting of polytetrafluoroethylene, polytrifluoroethylene, polyvinyl fluoride, polyvinylidene fluoride, polyacrylonitryl, polytrifluorochloro ethylene, and copolymers thereof; and said second membrane is a member of the group consisting of silicone rubber, polybutadiene, neoprene, butyl rubber, chlorosulfonated polyethylene, and polyesteramide-diisocyanate.

4. The fuel cell system of claim 3 which includes a plurality of fuel cells with the gas separator being constructed and arranged in operative association with said plurality of fuel cells for feeding the anodes of said plurality of cells with reactant gas from the downstream side of said first membrane.

5. The method of generating electricity in a fuel cell system comprising a fuel cell including an anode, a cathode, and an electrolyte constructed and arranged in operative association with a gas separator comprising a gas passage between first and second membranes, said first membrane being selectively permeable to a consumable fuel cell reactant gas and substantially non-permeable to a gas non-consumable in said fuel cell and the second membrane being substantially impermeable to the consumable fuel cell reactant gas and selectively permeable to gas impurities contained in said reactant gas, comprising feeding a reactant gas comprising a mixture of consumable and non-consumable gases into said gas passage, and simultaneously sweeping the downstream side of said second membrane with a sweep gas and removing reactant gas from the downstream side of said first membrane and feeding said purified reactant gas to the anode of said fuel cell.

6. The method of claim 5 wherein the anode of said fuel cell is contiguous with downstream side of said first membrane.

7. The method of claim 5 wherein the fuel cell system includes a plurality of fuel cell and said gas separator is spaced adjacent from said plurality of fuel cells and the reactant gas removed from the downstream side of said first membrane is fed to the anode of the plurality of cells.

8. The method of claim 5 wherein the first membrane is selected from the group consisting of polytetrafluoroethylene, polytrifluoroethylene, polyvinyl fluoride, polyvinylidene fluoride, polytrifluorochloro ethylene, polyacrylonitryl and copolymers thereof; and the second membrane is selected from the group consisting of silicone rubber, polybutadiene, neoprene, butyl rubber, chlorosulfonated polyethylene, and polyesteramide diisocyanate.

* * * * *